Dec. 18, 1962 G. F. LANKOW 3,068,706
CONTROL APPARATUS
Filed Feb. 19, 1960 2 Sheets-Sheet 1

YAW RATE GYRO

LEGEND
T = TORQUER
$S_T$ = SYNCHRO TRANSMITTER
$S_R$ = SYNCHRO RECEIVER
M = SERVO MOTOR
G = GRAVITY SENSOR
LOF = LINE OF FLIGHT

INVENTOR
GEORGE F. LANKOW

BY Roger W. Jensen

ATTORNEY

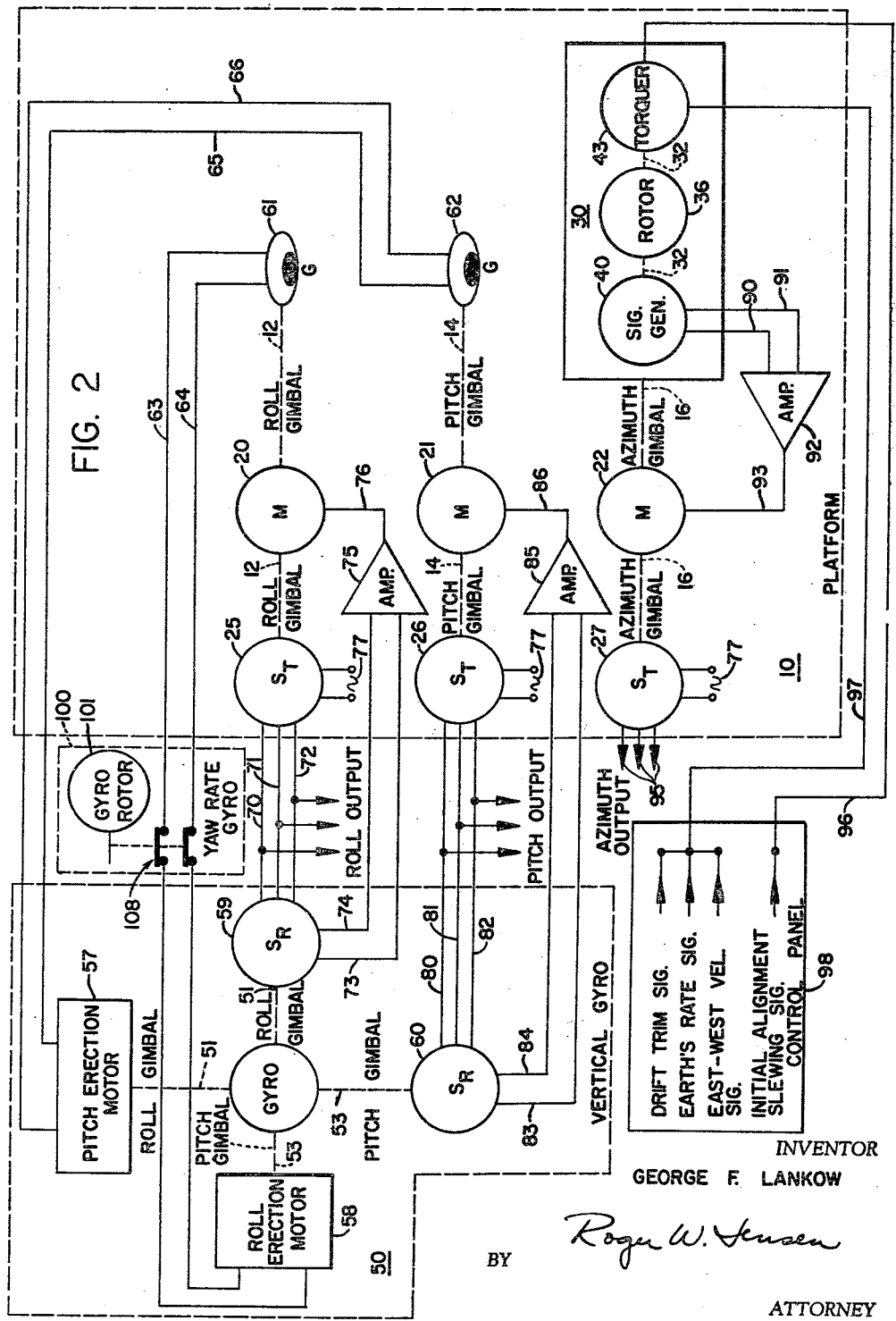

United States Patent Office 3,068,706
Patented Dec. 18, 1962

3,068,706
CONTROL APPARATUS
George F. Lankow, Fridley, Minn., assignor to Minneapolis-Honeywell Regulator Company, Minneapolis, Minn., a corporation of Delaware
Filed Feb. 19, 1960, Ser. No. 9,872
10 Claims. (Cl. 74—5.34)

This invention pertains generally to control apparatus and more specifically to a stabilized platform system. The invention is shown applied to but is not limited to a stabilized platform system forming part of an attitude reference system for a dirigible craft.

There have heretofore been provided atttiude reference systems comprising a multi-axis platform having at least two gimbals thereof stabilized from an external vertical gyro. The vertical gyro rotor case would be erected to vertical from some sort of gravity sensing means on the vertical gyro such as mercury switches. A telemetering arrangement would connect the vertical gyro to the multi-axis platform so that the platform would be slaved to the gyro. The platform then would serve as a support for a heading gyro for sensing deviation of the craft mounting the system about its yaw axis.

There were two factors in this prior art arrangement which contributed to errors in the operation of the system. The first was that the telemetering system would have certain errors therein. For example, if synchro receivers and transmitters were used to slave the platform gimbals to the vertical gyro gimbals, even with the most accurate synchros available, there would be an appreciable transmission error. To explain more completely, standard synchro receivers and transmitters presently available have errors of ±6′ each. Thus with the prior art arrangement it is possible that the platform gimbals could have a ±12′ offset or error away from the vertical. It will be understood that this deviation away from vertical would then misalign the input axis to the heading gyro mounted on the platform gimbals and accordingly would introduce errors into the heading control of the craft.

The second major source or error in the prior art system was caused by the gravity sensing means which control the erection of the vertical gyro. The gravity sensing means may take different forms but generally have some sort of seismic mass arrangement such as a globule of mercury in a mercury switch which responds to deviations of the spin axis of the vertical gyro away from vertical. The seismic mass actually shifts somewhat in response to the deviation away from vertical and the resulting shift in mass of the seismic mass in turn causes adverse drifting of the vertical reference. This adverse drifting in turn is coupled from the vertical gyro or vertical reference to the platform and further contributes to a misalignment of the input axis of the heading reference gyro.

The present invention overcomes the two disadvantages above discussed by providing an improved navigation system or attitude reference system. More specifically the present invention provides an improved system for controlling the erection of the vertical reference by having acceleration sensing means or vertical sensing means mounted on the platform per se. This arrangement assures that the gimbals of the platform will be controlled substantially to the true vertical regardless of any transmission errors in the telemetering system. Further, the removal of the vertical sensors from the vertical reference such as a vertical gyro thus eliminates the resulting gyro drift of the prior art system.

It is an object of this invention therefore to provide an improved stabilized platform.

Another object of this invention is to provide an improved navigational system.

Another object of this invention is to provide an improved heading reference system for a dirigible craft.

Other objects of the invention will become apparent from a reading of the following specification and claims in conjunction with the accompanying drawings in which:

FIGURE 2 is an electrical schematic showing the interconnections between the various elements and components of the improved system.

Figure 1:
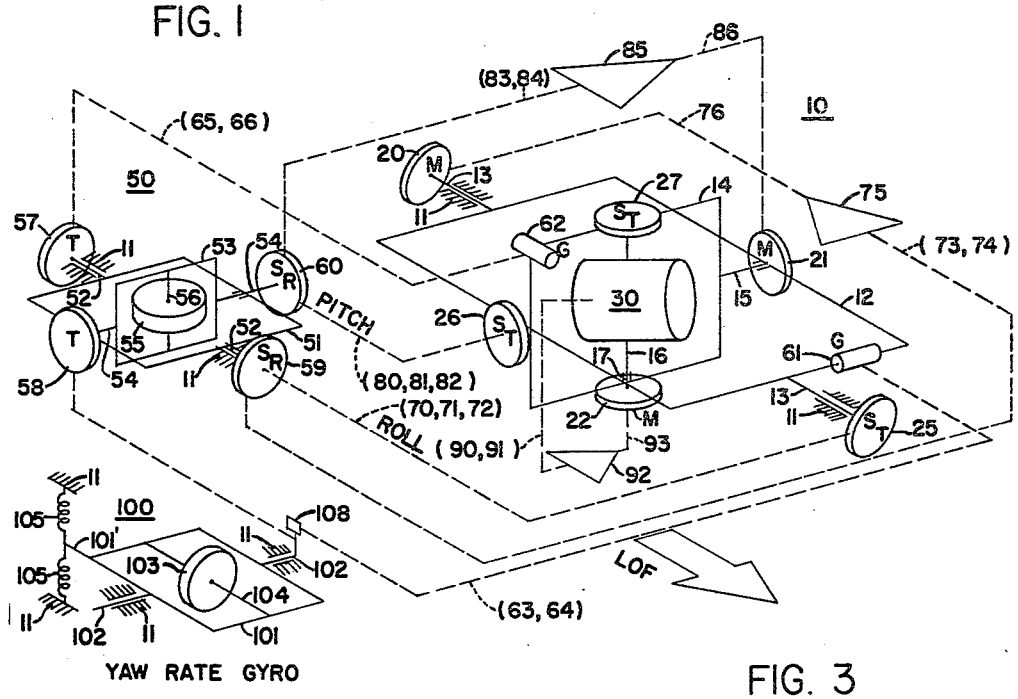
FIGURE 1 is a somewhat schematic representation of the improved system showing the mechanical configurations of the vertical reference and the platform stabilized therefrom.

Referring to FIGURE 1, the reference numeral 10 generally designates a multi-axis platform adapted to be supported on base means 11 which may be the frame or part of an aircraft or other dirigible craft. The platform 10 comprises a first platfonm gimbal 12 supported on base 11 by suitable bearing means schematically represented by reference numerals 13 which collectively define a first gimbal axis. Axis 13—13 may be aligned or parallel with one of the axes of the dirigibe craft. In a preferred embodiment for a craft having roll, pitch and yaw axes, the axis 13—13 of the platform would be either aligned with or parallel to the roll axis or line of flight of the dirigible craft.

A second gimbal 14 is mounted through suitable bearing means 15 (only one visible in FIGURE 1) for rotation relative to said first platform gimbal about a second gimbal axis 15—15 which is perpendicular to the first gimbal axis 13—13.

A third platform gimbal 16 is rotatably mounted on the second platform gimbal 14 through suitable bearing means 17 (only one of which is visible in FIGURE 1) for rotation relative to the second platform gimbal 14 about a third gimbal axis 17—17 which is perpendicular to the second gimbal axis 15—15.

The platform 10 may also be considered to comprise a gimbal 16 which is rotatably supported for rotation about a first axis (17—17) on at least two additional gimbals 14 and 12 having mutually perpendicular displacement axes 15—15 and 13—13.

Each of the axes of the platform 10 has motor means associated therewith for causing upon selective energization or actuation thereof relative rotation between the gimbal and its support. More specifically a motor means 20 is connected to the base means 11 and to the first platform gimbal 12 and is adapted when actuated to rotate the gimbal 12 about axis 13—13 relative to the base 11. A second platform motor means 21 is connected to the first gimbal 12 and to the second gimbal 14 and is adapted when actuated to rotate the second platform gimbal 14 about axis 15—15 relative to the first gimbal 12. The third platform motor means 22 is connected to the second gimbal 14 and to the third gimbal 16 and is adapted when actuated to rotate the third gimbal 16 about axis 17—17 relative to the second gimbal 14. The details of the motor means have not been disclosed since they are conventional and form no direct part in the invention.

Means are also provided for measuring relative rotation of the platform gimbals relative to their supports. These measuring means or pickoff means may take various configurations, the specific pickoffs shown being of the synchro type. It will be understood however that other types of pickoffs may be used. More specifically a first platform pickoff 25 is connected to the base means 11 and to the first gimbal 12 and is adapted to measure and have an output indicative of rotation of the first gimbal 12 relative to the base 11 about the first gimbal rotational axis 13—13. A second platform pickoff means 26 is connected to the first gimbal 12 and the second gimbal 14 and is adapted to measure and have an output indicative of rotation of the second gimbal 14 relative to the first gimbal 12 about the second platform gimbal axis 15—15. A third platform pickoff means 27 is connected to the second platform gimbal 14 and to the third platform gimbal 16 and is adapted to measure and to have an output indicative of rotation of the third gimbal 16 relative to the second gimbal 14 about the third platform gimbal axis 17—17.

Figure 3:
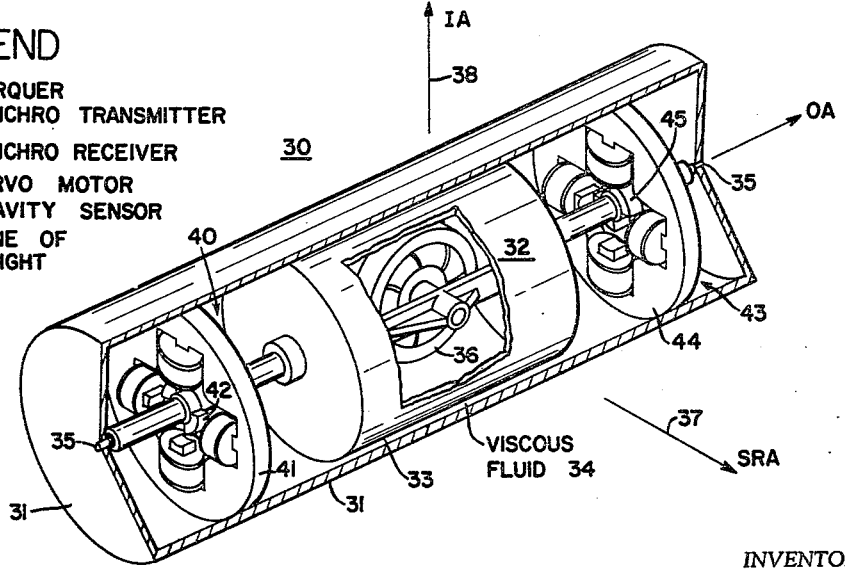
FIGURE 3 is a somewhat schematic representation of a single degree of freedom gyroscope which may be used as the heading reference in the present system.

A heading reference gyroscope is adapted to be mounted on the third platform gimbal 16. The heading reference gyro may take different configurations. The specific heading reference gyro shown in the present system is a single degree of freedom gyroscope 30 having an input axis, an output axis, and a spin reference axis. Referring to FIGURE 3, a typical single degree of freedom gyroscope is schematically depicted. This gyroscope may well be of the type generally shown in the Jarosh et al. Patent 2,752,791 granted July 3, 1956. In the gyro 30 shown in FIGURE 3 the reference numeral 31 designates a hollow housing in which is disposed a gimbal assembly 32. The gimbal assembly 32 takes the form of a hollow cylindrical member the outer diameter of which is slightly less than the inner diameter of the housing 31, an annular gap 33 being defined therebetween. A viscous fluid 34 is adapted to be provided within the housing 31 having a density substantially equal to the density of the gimbal assembly 32 so that the gimbal is supported in substantially neutral suspension. The gimbal assembly is supported by suitable bearing means such as bearing means 35 so that it is supported for rotation about an output axis (OA) 35—35. The gimbal assembly includes a gyroscopic means having a rotor element 36 adapted to spin about a spin reference axis (SRA) 37. The gyro tends to precess about its output axis 35—35 in response to rotation of the case 31 about the gyro input axis (IA) 38 which is that axis perpendicular to both the OA 35—35 and SRA 37.

Referring back to FIGURE 1 the gyro 30 is positioned or mounted on the third gimbal 16 by suitable means such that the input axis 38 thereof its either aligned with or parallel to the third gimbal axis 17—17. The gyro 30 further includes signal generating means 40 which may be of any suitable type such as the so-called microsyn type described in the Mueller Patent 2,448,734 granted November 22, 1949. Generally this type of signal generating means includes a stator element 41 mounted within the housing 31 and a rotor or armature element 42 adapted to rotate with the gimbal assembly 32.

The gyro 30 further includes torque producing means which also may be of the type described in the referenced Mueller patent. The torque producing means generally identified by the reference numeral 43 includes a stator element 44 mounted within the housing 31 and an armature or rotor element 45 connected to and adapted to rotate with the gimbal assembly 32. Other arrangements may be used for generating signals and torquing the gimbal. For example combination torquers and signal generators may be used.

The attitude reference system further includes a two axis displacement gyro generally depicted by the reference numeral 50. The displacement gyro may well be of the type known in the art as a vertical gyro such as that shown in the Brown Patent 2,645,129 granted July 14, 1953. Gyro 50 comprises a first gyro gimbal 51 rotatably supported through suitable bearing means 52 on a suitable base means such as the frame 11 of the dirigible craft. In the preferred embodiment the axis 52—52 or the first gyro displacement axis will be parallel to or aligned with the first platform gimbal axis 13—13. The two axis displacement gyro further includes a second gyro gimbal 53 mounted through suitable bearing means 54 on the first gyro gimbal 51 for rotation about a second gyro displacement axis 54—54 perpendicular to the first gyro displacement axis 52—52. The gyro 50 further includes a rotor element schematically designated by the reference numeral 55 which is adapted to rotate about a gyro spin axis 56 and which is further mounted on the second gimbal 53, the mounting being such that the spin axis 56 is perpendicular to the second gyro displacement axis 54—54. The gyro has suitable means for precessing the rotor element 55 about its precessive axes 52—52 and 54—54. The precession causing means are depicted as being torquer elements 57 and 58 the details of which are conventional and which accordingly are not shown herein. Torquer 57 is connected to the first gimbal 51 and to the base means 11 and is adapted when actuated or energized to tend to rotate the first gyro gimbal 51 relative to the base means 11. As is well known by those skilled in the art the tendency to rotate the gimbal 51 about its displacement axis 52—52 will result in the second gimbal 53 being precessed through gyroscopic action about its displacement axis 54—54. The torquer 58 is connected to the first gimbal 51 and the second gimbal 53 and is adapted when actuated or energized to tend to rotate the second gimbal 53 relative to the first gimbal 51 about the displacement axis 54—54. As is well known, this tendency to rotate will result in a precession of the first gimbal 51 about its rotational or displacement axis 52—52. The sense of the precession is a function of the sense of the applied torque from the torque motors together with the direction of spin of the rotor element 55. The gyro 50 further includes a first gyro pickoff means 59 connected to the base means 11 and to the first gyro gimbal 51 which is adapted to measure and to have an output indicative of rotation of the first gyro gimbal 51 relative to the base 11. A second gyro pickoff means 60 is connected to the first gyro gimbal 51 and the second gyro gimbal 53 and is adapted to measure and to have an output indicative of rotation of said second gyro gimbal 53 relative to the first gyro gimbal 51. Generally the gyro pickoffs 59 and 60 may be selected much in the same manner as the pickoffs 25 and 26 of the platform 10. In the specific ssytem configuration shown, the pickoffs 25 and 26 of the platform are designated as synchro transmitters while the pickoffs 59 and 60 of the gyro 50 are designated as synchro receivers. This is one configuration that may be used in a telemetering system for slaving the platform gimbals to the gyro gimbals. As is well known the pickoffs 59 and 60 could be synchro transmitters and the pickoffs 25 and 26 could be synchro receivers. Other telemetering configurations may be used within the scope of the teaching of the present invention.

Suitable acceleration sensing means or gravity sensing means or vertical sensing means are provided on the platform 10. More specifically, a first gravity sensing means 61 is mounted on the first platform gimbal 12 and is adapted to sense deviations of the axis 15—15 away from level. A second gravity sensing means 62 is mounted on the second platform gimbal 14 and is adapted to sense deviations of the axis 13—13 away from level. The gravity sensing means 61 and 62 may be of any suitable type such as mercury switches. It will be further understood that the gravity sensing means may be positioned in different locations on the platform 10 from those shown. For example the gravity sensing means could be mounted directly on the third platform gimbal 16 for sensing deviations of the gimbal 16 away from vertical. It will be understood that the gravity sensing means generally provide the function of producing a signal indicative of the sense of deviation away from vertical. Some gravity sensing means such as electrolytic switches might if desired be provided with the present system for producing signals both indicative of both the sense and magnitude of deviation away from vertical.

The system further includes a plurality of electrical connection means which are quite schematically shown in FIGURE 1 and more completely shown in FIG- URE 2. In FIGURE 2 elements which correspond to similar elements in FIGURE 1 have the same reference numerals. A pair of leads 63 and 64 connect the first gravity sensing means 61 to the second gyro torquer means 58. A pair of leads 65 and 66 connect the second gravity sensing means to the first gyro torquer means or torquer 57. Suitable means not shown are provided for energizing the motors 57 and 58. The function of the gravity sensing means 61 and 62 then is to control the energization to the torquers 58 and 57 respectively. Leads 70, 71 and 72 connect the synchro transmitter 25 or first platform pickoff means to the synchro receiver 59 or first gyro pickoff means. Leads 73 and 74 connect the synchro receiver 59 or first gyro pickoff means to an amplifier 75 and thence through a lead 76 to a first platform motor means 20 which is designated in FIGURE 2 as being a roll servo for that case where the first platform gimbal axis 13—13 is the same as the roll axis or line of flight of the craft. It will be noted that the synchro transmitter 25 is adapted to be energized by a source of voltage 77.

Leads 80, 81 and 82 connect the synchro transmitter 26 or second platform pickoff means to the synchro receiver 60 or the second gyro pickoff means. Leads 83 and 84 connect the synchro receiver 60 or second gyro pickoff means to a suitable amplifier 85 which in turn is connected through a suitable means 86 to the second platform motor means 21 which for the example given is designated as a pitch servo since the axis 15—15 would correspond to the pitch axis of a craft when the axis 13—13 is aligned with or parallel to the roll axis of the craft. The synchro transmitter 26 is also energized from a source of energization 77. A pair of leads 90 and 91 connect the signal generator 40 of the heading reference gyro 30 to a suitable amplifier 92 which in turn is connected to the azimuth gimbal servo 22 through a suitable connection means 93. The gimbal 16 in FIGURE 2 has been designated as the azimuth gimbal (and the servo 22 as the azimuth servo) for that case where axes 13—13 and 15—15 are aligned with the roll or pitch axes respectively of the craft. The third platform pickoff means 27 which is depicted as being a synchro transmitter receives suitable energization from a source of power 77 and has three output leads 95 adapted to be connected to additional control means or controlled means not shown. For example the synchro transmitter 27 could be connected through suitable means to an autopilot for dirigible craft or to some type of display apparatus for presenting a display of craft heading.

The gyro torquer 43 is connected through a pair of leads 96, 97 to a control panel 98 where control signals may be applied to the torquer. For example control signals or correction signals indicative of drift trim, error rate, or east-west velocity may be applied through lead 97 to the torquer 43. An initial alignment slewing signal may be applied through lead 96 to the torquer. It will be understood that the torquer may have frequency compensation not shown and that the gyro 30 may well have temperature compensation not shown. These features are conventional and form no direct part of the invention.

In some applications it may be desired to provide an erection cutout to the roll erection motor or torquer on the gyro 50. Thus when the craft deviates about its yaw axis at a rate above a predetermined level, it generally is desired to disable the erection of the gyro 50 about its roll axis in order to prevent the erection to a false vertical. This feature is accomplished in the present invention by providing a yaw rate gyro 100 including a gimbal 101 adapted to be rotatably supported through a pair of suitable bearing means 102 on suitable base means such as the craft 11. The gimbal 101 has mounted thereon for rotation a gyro rotor 103, the spin axis 104 of which is perpendicular to the axis 102—102. An input axis of the yaw rate gyro which is perpendicular to both axes 104 and 102—102 is aligned with or parallel to the yaw axis of the craft. Suitable means are provided for restraining the precession of the gimbal 101 about its precession axis 102—102, the specific means shown being a pair of spring elements 105 connected between the base 11 and an extension 101' on the gimbal 101. A switch mechanism 108 is adapted to be actuated by the yaw rate gyro 100 and serves to disable the connections 63 and 64 between the first gravity sensor 61 and the second gyro torquer 58 when the yaw rate of the craft exceeds a predetermined level. This arrangement is schematically shown in FIGURE 2 by having a switch arm 108 connected to the gimbal 101 of the yaw rate gyro. It will be understood that normally there is a continuous connection through leads 63 and 64 between the gravity sensor 61 and the roll erection motor 58.

*Operation*

As above discussed, the function of the vertical gyro 50 is to stabilize the platform 10. An object of the system is to maintain the third platform gimbal 16 as close to vertical as possible so that the input axis 38 of the gyro 30 will be in turn substantially in a vertical orientation at all times. When this is accomplished then the gyro 30 can accurately measure any deviation of the craft about its yaw axis. Assume that the gimbals 12 and 14 of the platform are level about their respective axes 13—13 and 15—15. Assume further that the output of the synchro transmitters 25 and 26 matches that of the synchro receivers 59 and 60 respectively. This condition would be true for a static condition where the gimbals 12 and 14 were slaved respectively without any error signal to the gimbals 51 and 53 of the vertical gyro. Under that set of conditions there would be no controlling output from the synchro receivers 59 and 60 through their connection leads 73—74 and 83—84 to their respective amplifiers 75 and 85.

If the gimbals 12 and 14 individually or collectively tend to deviate away from vertical then the gravity sensors 61 and/or 62 would produce controlling signals for their respective torque motors on the vertical gyro. For example if the gravity sensor 61 sensed a deviation of axis 15—15 away from level then a controlling signal would be applied through leads 63 and 64 to the roll erection motor 58. The energization of the roll erection motor or torquer 58 would then tend to rotate the gimbal 53 of the gyro 50 about its displacement axis 54—54. This applied torque to the gimbal 53 would through gyroscopic action actually precess the gimbal 51 about its precession axis 52—52 and would cause a change in the output of the synchro receiver 59 mounted or connected to the first gyro gimbal 51. Now the output of the synchro receiver 59 no longer matches that of the synchro transmitter 25 and accordingly a controlling signal is produced at leads 73 and 74, the signal being applied through amplifier 75 and connection means 76 to the roll servomotor 20 connected to the first platform gimbal 12. The sense of the servo system is such that the gimbal 12 will be rotated in a sense tending to bring the gimbal 12 back to a condition or position where the first gravity sensor 61 is level.

If the second gravity sensor 62 is moved away from a level orientation, then it will produce a controlling signal through leads 65 and 66 to the pitch erection motor or torquer 57 connected to the first gyro gimbal 51. This energization will apply a torque to the gimbal 51 tending to cause it to rotate about the rotational axis 52—52. However, through gyroscopic action the ultimate effect on the gyro 50 will be that the energization of the torquer 57 will be to precess the second gyro gimbal 53 about its precession axis 54—54 in turn changing the output of the synchro receiver 60 connected thereto. The output of synchro receiver 60 now being different from that of synchro transmitter 26 on the platform causes an output to be applied through leads 83 and 84 to the amplifier 85 and the connection means 86 to the pitch servomotor 21 connected to the second platform gimbal 14 which will bring the second gravity sensor 62 back to a level orientation.

If the dirigible craft should change either its pitch or its roll attitude thus tending to displace the axis 17—17 of the third platform gimbal 16 away from vertical the gyro 50 will sense such deviation or displacement and provide correcting signals to keep the axis 17—17 of the platform vertical. The gyro rotor 55 will through gyroscopic rigidity tend to remain fixed in inertial space regardless of instantaneous deviations of the craft in pitch and/or roll. Assume that there was a pitch deviation of the craft then the synchro receiver 60 connected to the pitch gimbal 53 of the gyro 50 would have its output changed in a sense so that a controlling signal of a proper sense would be applied through leads 83 and 84 to the pitch servo 21 of the platform rotating the second platform gimbal 14 in the proper sense so as to maintain the third platform gimbal 16 vertical. It will be understood that by having the proper amount of gain or amplification in the servo systems linking the gyro 50 to the platform 10 that there could be substantially no lag in the correction to the platform 10. The same type of operation applies for deviation of the craft in roll. For that case a signal would be produced in the roll synchro receiver 59 of the gyro 50 causing an output to be applied through leads 73 and 74 so as to energize the roll servo 20 connected to the roll or first gimbal 12 of the platform to rotate the same in a direction to maintain the position of the roll gimbal 12 substantially fixed in space insofar as rotation about its axis 13—13 is concerned.

The above description of operation indicates how the axis 17—17 of the third platform gimbal is maintained substantially vertical. This in turn assures that the input axis 38 of the gyro 30 is maintained substantially vertical. With this arrangement, any deviation of the craft about its yaw or vertical axis is sensed by the gyro 30. Assume a deviation of the craft in yaw. This would cause the gimbal assembly 32 of the gyro 30 to precess in one sense about its output axis 35—35 and to develop a signal in the gyro signal generator 40 indicative of this precession. The signal from the signal generator 40 is then applied through the connecting means 90 and 91 to the amplifier 92 and thence through the connection means 93 to the azimuth gimbal servomotor 22, the sense of energization to the servo 22 being such that it will rotate the azimuth gimbal 16 to bring the gyro 30 back to its initial position. In other words the servo loop including the signal generator 40, amplifier 92, and servo 22 is such that it always tends to reduce the error signal to zero. With this arrangement the gimbal assembly 32 of the gyro is never permitted to precess too far away from its null signal producing position, it being understood that as the servo 22 rotates the gyro 30 about its input axis 38 back to its null or initial position the gimbal assembly 32 is also positioned back toward its original or null signal producing position.

As explained above if the craft is yawing or turning at an excessive rate then the yaw rate gyro 100 will function to disable the erection of the roll gimbal 51 of the vertical gyro 50.

As indicated the leads 95 connected to the synchro transmitter 27 may be connected to control means or controlled means such as an autopilot or an attitude indicator. It will be further understood that the leads 70—72 and 80—82 may be connected to suitable means for roll output uses. These uses may be for visual presentation of roll and pitch of the craft or may well be used for control purposes such as in autopilot applications.

While I have shown and described a specific embodiment of this invention, further modifications and improvements will occur to those skilled in the art. I desire it to be understood, therefore, that this invention, is not limited to the particular form shown, and I intend in the appended claims to cover all modifications which do not depart from the spirit and scope of this invention.

I claim as my invention:

1. In an attitude reference system: base means; a platform comprising a first platform gimbal mounted on said base means for rotation about a first platform axis, a first platform motor means connected to said base means and to said first platform gimbal and adapted when actuated to rotate said first platform gimbal relative to said base, a first platform pickoff means connected to said base means and to said first platform gimbal and adapted to have an output indicative of relative rotation of said first platform gimbal and said base means, a first gravity sensing means mounted on said first platform gimbal, a second platform gimbal mounted on said first platform gimbal for rotation about a second platform axis perpendicular to said first platform axis, a second platform motor means connected to said first and second platform gimbals and adapted when actuated to rotate said second platform gimbal relative to said first platform gimbal, a second platform pickoff means connected to said first and second platform gimbals and adapted to have an output indicative of relative rotation of said second platform gimbal and said first platform gimbal, a second gravity sensing means mounted on said second platform gimbal, a third platform gimbal mounted on said second platform gimbal for rotation about a third platform axis perpendicular to said second platform axis, third platform motor means connected to said third and second platform gimbals and adapted when actuated to rotate said third platform gimbal relative to said second platform gimbal, third platform pickoff means connected to said second and third platform gimbals and adapted to have an output indicative of relative rotation of said second and said third platform gimbals, a single degree of freedom gyroscope having an input axis, an output axis, and a spin reference axis mounted on said third gimbal with said input axis being parallel with said third platform gimbal axis, said gyroscope having signal generating means for producing a signal indicative of movement of said gyroscope about its output axis; a two axis displacement gyroscope comprising a first gyroscope gimbal mounted on said base means for rotation about a first gyro displacement axis, a first gyro pickoff means connected to said base means and to said first gyro gimbal and adapted to have an output indicative of rotation of said first gyro gimbal relative to said base means, a first gyro torquer connected to said base means and to said first gyro gimbal and adapted when actuated to tend to rotate said first gyro gimbal relative to said base means, a second gyro gimbal mounted on said first gyro gimbal for rotation about a second gyro displacement axis perpendicular to said first gyro displacement axis, a second gyro pickoff means connected to said first and said second gyro gimbals and adapted to have an output indicative of rotation of said second gyro gimbal relative to said first gyro gimbal, a second gyro torquer connected to said first and said second gyro gimbals and adapted when actuated to tend to rotate said second gyro gimbal relative to said first gyro gimbal, a gyroscope rotor means mounted on said second gyro gimbal for rotation about a gyro spin axis perpendicular to said second gyro displacement axis; and a plurality of connection means comprising means connecting said first gravity sensing means to said second gyro torquer means, means connecting said second gravity sensing means to said first gyro torquer means, means connecting said first platform pickoff means to said first gyro pickoff means, means connecting said first gyro pickoff means to said first platform motor means, means connecting said second platform pickoff means to said second gyro pickoff means, means connecting said second gyro pickoff means to said second platform motor means, means connecting said single degree of freedom gyroscope signal generating means to said third platform motor means, and means connected to said third platform pickoff means.

2. In an attitude reference system; base means; a platform comprising a first platform gimbal mounted on said base means for rotation about a first platform axis, first platform motor means connected to said base means and to said first platform gimbal and adapted when actuated to rotate said first platform gimbal relative to said base, first platform pickoff means connected to said base means and to said first platform gimbal and adapted to have an output indicative of relative rotation of said first platform gimbal and said base means, first gravity sensing means mounted on said platform, a second platform gimbal mounted on said first platform gimbal for rotation about a second platform axis perpendicular to said first platform axis, second platform motor means connected to said first and said second platform gimbals and adapted when actuated to rotate said second platform gimbal relative to said first platform gimbal, second platform pickoff means connected to said first and second platform gimbals and adapted to have an output indicative of relative rotation of said second platform gimbal and said first platform gimbal, second gravity sensing means mounted on said platform, a third platform gimbal mounted on said second platform gimbal for rotation about a third platform axis perpendicular to said second platform axis, third platform motor means connected to said third and said second platform gimbals and adapted when actuated to rotate said third platform gimbal relative to said second platform gimbal, third platform pickoff means connected to said second and third platform gimbals and adapted to have an output indicative of relative rotation of said second and said third platform gimbals, a gyroscope having an input axis, an output axis, and a spin reference axis mounted on said third gimbal with said input axis being parallel with said third platform gimbal axis, said gyroscope having signal generating means for producing a signal indicative of movement of said gyroscope about its output axis; a two axis displacement gyroscope comprising a first gyroscope gimbal mounted on said base means for rotation about a first gyro displacement axis, first gyro pickoff means connected to said base means and to said first gyro gimbal and adapted to have an output indicative of rotation of said first gyro gimbal relative to said base means, first gyro torquer means connected to said base means and to said first gyro gimbal and adapted when actuated to tend to rotate said first gyro gimbal relative to said base means, a second gyro gimbal mounted on said first gyro gimbal for rotation about a second gyro displacement axis perpendicular to said first gyro displacement axis, second gyro pickoff means connected to said first and said second gyro gimbals and adapted to have an output indicative of rotation of said second gyro gimbal relative to said first gyro gimbal, second gyro torquer means connected to said first and second gyro gimbals and adapted when actuated to tend to rotate said second gyro gimbal relative to said first gyro gimbal, a gyroscope rotor means mounted on said second gyro gimbal for rotation about a gyro spin axis perpendicular to said second gyro displacement axis; and a plurality of connection means comprising means connecting said first gravity sensing means to said second gyro torquer means, means connecting said second gravity sensing means to said first gyro torquer means, means interconnecting said first platform pickoff means, said first gyro pickoff means, and said first platform motor means, means interconnecting said second platform pickoff means, said second gyro pickoff means, and said second platform motor means, and means connecting said gyroscope signal generating means to said third platform motor means.

3. In an attitude reference system: base means; a platform comprising a first platform gimbal mounted on said base means for rotation about a first platform axis, first platform motor means adapted to rotate said first platform gimbal relative to said base, first platform pickoff means adapted to have an output indicative of relative rotation of said first platform gimbal and said base means, a second platform gimbal mounted on said first platform gimbal for rotation about a second platform axis perpendicular to said first platform axis, second platform motor means adapted to rotate said second platform gimbal relative to said first platform gimbal, second platform pickoff means adapted to have an output indicative of relative rotation of said second platform gimbal and said first platform gimbal, a third platform gimbal mounted on said second platform gimbal for rotation about a third platform axis perpendicular to said second platform axis, third platform motor means adapted to rotate said third platform gimbal relative to said second platform gimbal, third platform pickoff means adapted to have an output indicative of relative rotation of said second and said third platform gimbals, a gyroscope having an input axis, an output axis, and a spin reference axis mounted on said third gimbal with said input axis being parallel with said third platform gimbal axis, said gyroscope having signal generating means for producing a signal indicative of movement of said gyroscope about its output axis, and gravity sensing means on said platform; a two axis displacement gyroscope comprising a first gyroscope gimbal mounted on base means for rotation about a first gyro displacement axis, first gyro pickoff means adapted to have an output indicative of rotation of said first gyro gimbal relative to its base means, first gyro torquer means adapted to tend to rotate said first gyro gimbal relative to its base means, a second gyro gimbal mounted on said first gyro gimbal for rotation about a second gyro displacement axis perpendicular to said first gyro displacement axis, second gyro pickoff means adapted to have an output indicative of rotation of said second gyro gimbal relative to said first gyro gimbal, second gyro torquer means adapted to tend to rotate said second gyro gimbal relative to said first gyro gimbal, gyroscope rotor means mounted on said second gyro gimbal for rotation about a gyro spin axis perpendicular to said second gyro displacement axis; and a plurality of connection means comprising means connecting said gravity sensing means to said first and second gyro torquer means, means interconnecting said first platform pickoff means, said first gyro pickoff means, and said first platform motor means, and means interconnecting said second platform pickoff means, said second gyro pickoff means, and said second platform motor means.

4. In a heading reference system for a dirigible craft: a platform comprising a first platform gimbal adapted to be mounted on said craft for rotation about a first platform axis, first platform motor means adapted to be connected to said craft and to said first platform gimbal and adapted when actuated to rotate said first platform gimbal relative to said craft, first platform pickoff means adapted to be connected to said craft and to said first platform gimbal and adapted to have an output indicative of relative rotation of said first platform gimbal and said craft, a second platform gimbal mounted on said first platform gimbal for rotation about a second platform axis perpendicular to said first platform axis, second platform motor means connected to said first and said second platform gimbals and adapted when actuated to rotate said second platform gimbal relative to said first platform gimbal, second platform pickoff means connected to said first and second platform gimbals and adapted to have an output indicative of relative rotation of said second platform gimbal and said first platform gimbal, a third platform gimbal mounted on said second platform gimbal for rotation about a third platform axis perpendicular to said second platform axis, third platform motor means connected to said third and said second platform gimbals and adapted when actuated to rotate said third platform gimbal relative to said second platform gimbal, third platform pickoff means connected to said second and third platform gimbals and adapted to have an output indicative of relative rotation of said second and said third platform gimbals, a gyroscope having an input axis, an output axis, and a spin reference axis mounted on said third gimbal with said input axis being parallel with said third platform gimbal axis, said gyroscope having signal generating means for producing a signal indicative of movement of said gyroscope about its output axis, vertical sensing means mounted on said platform and adapted to have an output indicative of the verticality of said third platform gimbal axis; a two axis displacement gyroscope comprising a first gyroscope gimbal adapted to be mounted on said craft for rotation about a first gyro displacement axis, said first gyro displacement axis being substantially parallel to said first platform axis, first gyro pickoff means adapted to be connected to said craft and to said first gyro gimbal and adapted to have an output indicative of rotation of said first gyro gimbal relative to said craft, first gyro torquer means adapted to be connected to said craft and to said first gyro gimbal and adapted when actuated to tend to rotate said first gyro gimbal relative to said craft, a second gyro gimbal mounted on said first gyro gimbal for rotation about a second gyro displacement axis perpendicular to said first gyro displacement axis, second gyro pickoff means connected to said first and said second gyro gimbals and adapted to have an output indicative of rotation of said second gyro gimbal relative to said first gyro gimbal, second gyro torquer means connected to said first and said second gyro gimbals and adapted when actuated to tend to rotate said second gyro gimbal relative to said first gyro gimbal, gyroscope rotor means mounted on said second gyro gimbal for rotation about a gyro spin axis perpendicular to said second gyro displacement axis; means connecting said vertical sensing means to said first and second gyro torquer means, means connecting said first platform pickoff means, said first gyro pickoff means, and said first platform motor means, means connecting said second platform pickoff means, said second gyro pickoff means, and said second platform motor means, means connecting said gyroscope signal generating means to said third platform motor means, and means connected to said third platform pickoff means.

5. In a heading reference system for a dirigible craft having roll, pitch and yaw axes: a platform comprising a first platform gimbal adapted to be mounted on said craft for rotation about a first platform axis parallel to said roll axis, first platform motor means adapted to be connected to said craft and to said first platform gimbal and adapted when actuated to rotate said first platform gimbal relative to said craft, first platform pickoff means connected to said craft and to said first platform gimbal and adapted to have an output indicative of relative rotation of said first platform gimbal and said craft, a second platform gimbal mounted on said first platform gimbal for rotation about a second platform axis perpendicular to said first platform axis, second platform motor means connected to said first and said second platform gimbals and adapted when actuated to rotate said second platform gimbal relative to said first platform gimbal, second platform pickoff means connected to said first and second platform gimbals and adapted to have an output indicative of relative rotation of said second platform gimbal and said first platform gimbal, a third platform gimbal mounted on said second platform gimbal for rotation about a third platform axis perpendicular to said second platform axis, third platform motor means connected to said third and said second platform gimbals and adapted when actuated to rotate said third platform gimbal relative to said second platform gimbal, third platform pickoff means connected to said second and third platform gimbals and adapted to have an output indicative of relative rotation of said second and said third platform gimbals, a gyroscope having an input axis, an output axis, and a spin reference axis mounted on said third gimbal with said input axis being aligned with said third platform gimbal axis, said gyroscope having signal generating means for producing a signal indicative of displacement of said gyroscope about its output axis; first and second gravity sensing means mounted on said platform and adapted to have an output indicative of the verticality of said third platform gimbal axis; a two axis displacement gyroscope comprising a first gyroscope gimbal adapted to be mounted on said craft for rotation about a first gyro displacement axis parallel to said roll axis, first gyro pickoff means adapted to be connected to said craft and to said first gyro gimbal and adapted to have an output indicative of rotation of said first gyro gimbal relative to said craft, a first gyro torquer adapted to be connected to said craft and to said first gyro gimbal and adapted when actuated to rotate said first gyro gimbal relative to said craft, a second gyro gimbal mounted on said first gyro gimbal for rotation about a second gyro displacement axis perpendicular to said first gyro displacement axis, second gyro pickoff means connected to said first and said second gyro gimbals and adapted to have an output indicative of rotation of said second gyro gimbal relative to said first gyro gimbal, second gyro torquer means connected to said first and said second gyro gimbals and adapted when actuated to tend to rotate said gyro gimbal relative to said first gyro gimbal, a gyroscope rotor means mounted on said second gyro gimbal for rotation about a gyro spin axis perpendicular to said second gyro displacement axis; means connecting said first gravity sensing means to said second gyro torquer means; means for disabling the connection of said first gravity sensing means to said second gyro torquer means; means connecting said second gravity sensing means to said first gyro torquer; means connecting said first platform pickoff means, said first gyro pickoff means, and said first platform motor means; means connecting said second platform pickoff means, said second gyro pickoff means, and said second platform motor means; means connecting said single degree of freedom gyroscope signal generating means to said third platform motor means; and means connected to said third platform pickoff means.

6. In a stabilized platform system: a platform comprising a first gimbal rotatably supported for rotation about a first axis on at least two additional gimbals having mutually perpendicular displacement axes; torque producing means connected to each of said additional gimbals and adapted to rotate each gimbal relative to its support; pickoff means connected to each of said additional gimbals and adapted to have outputs indicative of rotation of each gimbal relative to its support; acceleration sensing means on said platform; gyroscopic means on said first gimbal having an input axis parallel to said first axis, said platform being adapted to be mounted on base means; a gyroscope adapted to be mounted on base means and having a spin axis and at least two mutually perpendicular displacement axes, pickoff means adapted to have an output indicative of displacement of said gyroscope about said displacement axes, torque producing means adapted when actuated to precess said gyroscope about said gyroscope displacement axes; means connecting said acceleration sensing means to said gyroscope torque producing means; means connecting said platform pickoff means, said gyroscope pickoff means, and said platform torque producing means; and means including said gyroscopic means for controlling rotation of said first gimbal about said first axis.

7. In a stabilized platform system: a platform comprising a first gimbal rotatably supported for rotation about a first axis on at least two additional gimbals having mutually perpendicular displacement axes; torque producing means connected to each of said additional gimbals and adapted to rotate each gimbal relative to its support; pickoff means connected to each of said additional gimbals and adapted to have an output indicative of rotation of each gimbal relative to its support; vertical sensing means on said platform adapted to have an output indicative of the verticality of said first gimbal; inertial means on said first gimbal: a gyroscope having a spin axis and at least two mutually perpendicular displacement axes, pickoff means adapted to have an output indicative of displacement of said gyroscope about said displacement axes, torque producing means adapted when actuated to precess said gyroscope about said gyroscope displacement axes; means connecting said vertical sensing means to said gyroscope torque producing means; and means connecting said platform pickoff means, said gyroscope pickoff means, and said platform torque producing means.

8. In a heading reference system for a dirigible craft: a platform comprising a first gimbal rotatably supported for rotation about a first axis on at least two additional gimbals having mutually perpendicular displacement axes; torque producing means connected to each of said additional gimbals and adapted to rotate each gimbal relative to its support; pickoff means connected to each of said additional gimbals and adapted to have an output indicative of rotation of each gimbal relative to its support; vertical sensing means on said platform adapted to have an output indicative of the verticality of said first gimbal; gyroscopic means on said first gimbal having an input axis parallel to said first axis, said platform being adapted to be mounted on a dirigible craft; a gyroscope adapted to be mounted on said craft and having a spin axis and at least two mutually perpendicular displacement axes, pickoff means adapted to have an output indicative of displacement of said gyroscope about said displacement axes, torque producing means adapted when actuated to precess said gyroscope about said gyroscope displacement axes; means connecting said vertical sensing means to said gyroscope torque producing means; means connecting said platform pickoff means, said gyroscope pickoff means, and said platform torque producing means; means including said gyroscopic means for controlling rotation of said first gimbal about said first axis; pickoff means connected to said first gimbal and adapted to have an output indicative of rotation of said first gimbal about said first axis; and controlled means connected to said last named pickoff means.

9. In a navigation system: a platform comprising a first gimbal rotatably supported for rotation about a first axis on at least two additional gimbals having mutually perpendicular displacement axes; torque producing means connected to each of said additional gimbals and adapted to rotate each of said additional gimbals relative to its support; pickoff means connected to each of said additional gimbals and adapted to have an output indicative of rotation of each gimbal relative to its support; acceleration sensing means on said platform; inertial means on said first gimbal including means mounted for movement relative to said first gimbal; gyroscope means having a spin axis and at least two mutually perpendicular displacement axes and comprising pickoff means adapted to have an output indicative of displacement of said gyroscope means about said gyroscope displacement axes, and torque producing means adapted when actuated to precess said gyroscope means about said gyroscope displacement axes; means connecting said acceleration sensing means to said gyroscope torque producing means; means connecting said platform pickoff means, said gyroscope pickoff means, and said platform torque producing means; and means connected to and controlled by said inertial means.

10. In a control system: a multi-axis platform comprising a support mounted on at least two gimbals having mutually perpendicular rotational axes; torque producing means connected to each of said gimbals and adapted to rotate each gimbal relative to its support; pickoff means adapted to have an output indicative of rotation of each of said gimbals relative to its supporting means; acceleration sensing means on said platform; sensing means on said support; a gyroscope having a spin axis and at least two mutually perpendicular displacement axes and comprising pickoff means adapted to have an output indicative of movement of said gyroscope about said displacement axes, and torque producing means adapted to precess said gyroscope about said gyroscope displacement axes; means connecting said acceleration sensing means to said gyroscope torque producing means; means connecting said platform and said gyroscope pickoff means, and said platform torque producing means; and means connected to and controlled by said sensing means on said support.

References Cited in the file of this patent
UNITED STATES PATENTS

| | | |
|---|---|---|
| 2,497,614 | Libman | Feb. 14, 1950 |
| 2,517,612 | Varian | Aug. 8, 1950 |
| 2,533,217 | Braddon | Dec. 12, 1950 |
| 2,835,132 | Vacquier | May 20, 1958 |